(12) United States Patent
Tanaka et al.

(10) Patent No.: US 9,089,947 B2
(45) Date of Patent: Jul. 28, 2015

(54) SPHERICAL BODY POLISHING APPARATUS, METHOD FOR POLISHING SPHERICAL BODY AND METHOD FOR MANUFACTURING SPHERICAL MEMBER

(75) Inventors: Yutaka Tanaka, Kuwana (JP); Katsutoshi Muramatsu, Kuwana (JP)

(73) Assignee: NTN CORPORATION, Osaka (JP)

(*) Notice: Subject to any disclaimer, the term of this patent is extended or adjusted under 35 U.S.C. 154(b) by 509 days.

(21) Appl. No.: 13/122,372

(22) PCT Filed: Sep. 24, 2009

(86) PCT No.: PCT/JP2009/066503
§ 371 (c)(1),
(2), (4) Date: Apr. 1, 2011

(87) PCT Pub. No.: WO2010/038646
PCT Pub. Date: Apr. 8, 2010

(65) Prior Publication Data
US 2011/0177760 A1    Jul. 21, 2011

(30) Foreign Application Priority Data
Oct. 3, 2008    (JP) .................................. 2008-258419

(51) Int. Cl.
*B24B 11/06*    (2006.01)
*B24B 37/025*    (2012.01)
(Continued)

(52) U.S. Cl.
CPC .............. *B24B 37/025* (2013.01); *B24B 11/06* (2013.01); *B24D 7/18* (2013.01); *F16C 33/32* (2013.01); *F16C 2206/40* (2013.01)

(58) Field of Classification Search
CPC ........ B24B 11/06; B24B 37/025; B24D 7/18; F16C 33/32

USPC ............................................ 451/50, 284, 262
See application file for complete search history.

(56) References Cited

U.S. PATENT DOCUMENTS 455,879 A * 7/1891 Jones ............................ 451/284
921,739 A * 5/1909 Rieske .............................. 72/75
(Continued)

FOREIGN PATENT DOCUMENTS

| CN | 101107096 A | 1/2008 |
| CN | 201109060 Y | 9/2008 |

(Continued)

OTHER PUBLICATIONS

FastFlex. Oct. 28, 2013. <http://www.fastflex.co.za/index.php?page=abrasion_mechanic>.*

(Continued)

*Primary Examiner* — Lee D Wilson
*Assistant Examiner* — Joel Crandall
(74) *Attorney, Agent, or Firm* — McDermott Will & Emery LLP (57) ABSTRACT

A spherical body polishing apparatus capable of reducing polishing costs includes a rotating disk having a rotating disk polishing surface and a fixed disk having a fixed disk polishing surface opposed to the rotating disk polishing surface. The rotating disk polishing surface is capable of relative rotation while keeping being opposed to the fixed disk polishing surface. The rotating disk polishing surface has a groove portion formed therein and extending circumferentially along the rotation. The rotating disk having the groove portion therein includes an abrasive grain layer having a higher hardness than that of a material ball which is a spherical body and a holding layer formed on the abrasive grain layer and having a lower hardness than that of the abrasive grain layer. The groove portion is formed to penetrate the holding layer in a depth direction and to reach the abrasive grain layer.

7 Claims, 3 Drawing Sheets

(51) Int. Cl.
*B24D 7/18* (2006.01)
*F16C 33/32* (2006.01)

(56) References Cited

U.S. PATENT DOCUMENTS

| | | | | |
|---|---|---|---|---|
| 1,176,099 | A * | 3/1916 | Rockwell | 451/284 |
| 1,337,079 | A * | 4/1920 | Kobayashi | 82/173 |
| 1,516,749 | A * | 11/1924 | Moore et al. | 451/65 |
| 1,624,642 | A * | 4/1927 | Vuilleumier | 451/284 |
| 1,973,922 | A * | 9/1934 | Dumas | 451/284 |
| 2,734,317 | A * | 2/1956 | Bond | 451/50 |
| 2,828,582 | A * | 4/1958 | Messerschmidt | 451/65 |
| 2,964,886 | A * | 12/1960 | Messerschmidt | 451/284 |
| 3,104,502 | A * | 9/1963 | Burch, Jr. | 451/50 |
| 3,545,139 | A * | 12/1970 | Brany | 451/50 |
| 3,565,248 | A * | 2/1971 | Messerschmidt et al. | 209/3.1 |
| 3,660,942 | A * | 5/1972 | Messerschmidt | 451/65 |
| 3,847,000 | A * | 11/1974 | Teague | 451/50 |
| 3,924,356 | A * | 12/1975 | Kitchel | 451/50 |
| 3,984,945 | A * | 10/1976 | Messerschmidt | 451/50 |
| 3,999,330 | A * | 12/1976 | Brany | 451/284 |
| 4,095,373 | A * | 6/1978 | Thobroe | 451/284 |
| 4,370,772 | A * | 2/1983 | Gustafsson | 15/97.1 |
| 4,903,439 | A * | 2/1990 | Hoffmann | 451/50 |
| 5,301,470 | A * | 4/1994 | Sato | 451/284 |
| 5,520,573 | A * | 5/1996 | Sumita et al. | 451/262 |
| 6,171,179 | B1 * | 1/2001 | Chiou et al. | 451/262 |
| 6,349,458 | B1 * | 2/2002 | Al-Rawi | 29/90.01 |
| 7,465,219 | B2 * | 12/2008 | Dixon et al. | 451/41 |
| 7,722,440 | B2 * | 5/2010 | Potzsch et al. | 451/49 |

| | | | |
|---|---|---|---|
| 2002/0141677 | A1 | 10/2002 | Murai et al. |
| 2007/0104399 | A1 * | 5/2007 | Hamza et al. ............ 384/91 |
| 2008/0171492 | A1 | 7/2008 | Potzsch et al. |

FOREIGN PATENT DOCUMENTS

| | | |
|---|---|---|
| JP | 162912 | 3/1944 |
| JP | 53-105786 A | 9/1978 |
| JP | 53-105786 A | 9/1979 |
| JP | 55-501173 A | 12/1980 |
| JP | 2000-210862 | 8/2000 |
| JP | 2000-326238 | 11/2000 |
| JP | 2001-025948 | 1/2001 |
| JP | 2002-263994 | 9/2002 |
| JP | 2003-214435 A | 7/2003 |
| SU | 831560 B * | 6/1981 |
| SU | 1030147 A * | 7/1983 |
| WO | 80/01664 A | 8/1980 |

OTHER PUBLICATIONS

Mohs Scale of Mineral Hardness. American Federation of Mineralogical Societies. Oct. 28, 2013. <http://www.amfed.org/t_mohs.htm>.*

Office Action issued in Chinese Patent Application No. 200980139747.2 dated Feb. 17, 2013.

Notice on the Second Office Action issued in Chinese Patent Application No. 200980139747.2 with Full English Translation mailed Sep. 22, 2013.

Japanese Office Action issued in Application No. 2008-258419 dated Apr. 16, 2013.

* cited by examiner

SPHERICAL BODY POLISHING APPARATUS, METHOD FOR POLISHING SPHERICAL BODY AND METHOD FOR MANUFACTURING SPHERICAL MEMBER

RELATED APPLICATIONS

This application is the U.S. National Phase under 35 U.S.C. §371 of International Application No. PCT/JP2009/066503, filed on Sep. 24, 2009, which in turn claims the benefit of Japanese Application No. 2008-258419, filed on Oct. 3, 2008, the disclosures of which Applications are incorporated by reference herein.

TECHNICAL FIELD

The present invention relates to a spherical body polishing apparatus, a method for polishing a spherical body and a method for manufacturing a spherical member, and more particularly to a spherical body polishing apparatus, a method for polishing a spherical body and a method for manufacturing a spherical member which are capable of reducing polishing costs.

BACKGROUND ART

A manufacturing process of a spherical member to be used as, for example, a rolling element of a rolling bearing or a valving element of a ball valve often includes the step of polishing the surface of a spherical body. To this step of polishing a spherical body, there are requests for improved efficiency, reduced costs and the like. Here, polishing of a spherical body is commonly practiced using abrasive grains having a greater hardness than that of the spherical body. Accordingly, when the spherical body is made of a high-hardness material, for example, ceramic such as silicon nitride and sialon, an abrasive grain having extremely high hardness and being expensive, such as diamond and CBN (Cubic Boron Nitride) must be used.

In response to this situation, studies aiming at improved efficiency and reduced costs have been conducted and various proposals have been made (see Japanese Patent Laying-Open No. 2000-210862 (Patent Document 1) and Japanese Patent Laying-Open No. 2000-326238 (Patent Document 2)).

PRIOR ART DOCUMENTS

Patent Documents

Patent Document 1: Japanese Patent Laying-Open No. 2000-210862
Patent Document 2: Japanese Patent Laying-Open No. 2000-326238

SUMMARY OF THE INVENTION

Problems to be Solved by the Invention

As described in Patent Document 1 above, diamond abrasive grains mixed into a lapping liquid and serving as loose abrasive grains cause the lapping liquid to affect dressing of a polishing surface plate, and polishing efficiency is improved. There is, however, a problem that a need for use of an expensive diamond abrasive grain or the like for the loose abrasive grain and an accelerated wearing away of the polishing surface plate caused by effects of the loose abrasive grains result in increased running costs.

Also, as described in Patent Document 2 above, employment of a grinding stone having a configuration in which abrasive grains made of boron carbide are bonded together with a bonding agent allows for reduced costs of the grinding stone as compared with that when an abrasive grain made of diamond or CBN is employed. In this case, however, there is a problem that processing efficiency also concurrently declines as compared with that when an abrasive grain made of diamond or CBN is employed, and it is therefore difficult to fully reduce polishing costs per se.

In view of the above, an object of the present invention is to provide a spherical body polishing apparatus, a method for polishing a spherical body and a method for manufacturing a spherical member, which are capable of reducing polishing costs.

Means for Solving the Problems

A spherical body polishing apparatus according to the present invention is a spherical body polishing apparatus for polishing the surface of a spherical body. The apparatus includes a first member having a first polishing surface and a second member having a second polishing surface opposed to the first polishing surface. The first polishing surface and the second polishing surface are capable of rotation relative to each other while keeping being opposed to each other. At least one of the first polishing surface and the second polishing surface has a groove portion formed therein and extending circumferentially along the rotation. At least one of the first member and the second member having the groove portion formed therein includes an abrasive grain layer including an abrasive grain having a higher hardness than that of the spherical body, and a holding layer formed on the abrasive grain layer and having a lower hardness than that of the abrasive grain layer. The groove portion is formed to penetrate the holding layer in a depth direction and to reach the abrasive grain layer.

A spherical body polishing apparatus may adopt a configuration in which a spherical body to be polished is held between a pair of members (surface plates) having respective polishing surfaces opposed to each other, and through the relative rotation of the pair of surface plates, polishing is carried out. In this case, at least one of the polishing surfaces of the pair of surface plates often has a groove portion formed therein and extending circumferentially for holding and polishing the spherical body. Here, in conventional spherical body polishing apparatuses, the entire polishing surface of the surface plate is an abrasive grain layer which includes abrasive grains having a higher hardness than that of the spherical body, and the groove portion is formed in the abrasive grain layer. The spherical body held between the pair of surface plates is polished by rolling and sliding on the groove portion formed in the abrasive grain layer while being held by the groove portion.

With such conventional spherical body polishing apparatuses, in the interest of a stable hold of the spherical body, the abrasive grain layer must have a sufficient depth of a groove portion formed therein. Also, the only region of the groove portion that contributes to polishing the spherical body the bottom and its vicinity of the groove portion, which come into contact with the spherical body. Thus, while securing a depth capable of providing a stable hold of the spherical body, the bottom portion of the groove portion must be located within the abrasive grain layer. The abrasive grain layer must therefore have a correspondingly sufficient thickness. This causes increased material costs and processing costs of the abrasive grain layer, especially with a high hardness and expensive abrasive grain. Also, continuous use of the spherical body polishing apparatus causes the groove portion in contact with the spherical body to gradually wear away and causes the groove portion to have an increased depth. Consequently, the opposed polishing surfaces could come into contact with each other. To avoid such contact, the spherical body polishing apparatus continuously used for a predetermined period requires processing for reducing the depth of the groove portion (correction processing on the groove portion depth). Specifically, the processing is achieved by performing grinding for removing a surface layer of the abrasive grain layer. The processing, however, often costs a lot since the abrasive grain layer includes abrasive grains having a higher hardness than that of the spherical body to be processed. In particular, when the abrasive grain includes an abrasive grain having extremely high hardness such as diamond and CBN, it is difficult to achieve the correction processing on the groove portion depth through grinding, and more costly electric discharge machining, for example, must be performed. Consequently, the correction processing on the groove portion depth requires extremely large costs.

In contrast, with the spherical body polishing apparatus of the present invention, a member in which a groove portion is formed includes an abrasive grain layer and a holding layer formed on the abrasive grain layer and having a lower hardness than that of the abrasive grain layer. The groove portion is formed to penetrate the holding layer in a depth direction and to reach the abrasive grain layer. As a result, at a bottom portion of the groove portion which contributes to polishing a spherical body, the abrasive grain layer is exposed, while a side wall portion of the groove portion which contributes to holding the spherical body is formed of the holding layer.

Having such a configuration, it is possible with the spherical body polishing apparatus of the present invention to provide a stable hold of the spherical body by increasing the thickness of the holding layer. It is therefore possible to restrict the depth of the groove portion formed in the abrasive grain layer and to reduce the thickness of the abrasive grain layer. As a result, according to the above-described configuration, material costs and processing costs of the abrasive grain layer can be suppressed. Further, with the above-described spherical body processing apparatus of the present invention, correction processing on the depth of the groove portion can be achieved by performing processing for removing a surface layer portion of the holding layer rather than the abrasive grain layer having a high hardness. Reduction of running costs in continuous use of the spherical body processing apparatus can therefore be achieved.

According to the spherical body polishing apparatus of the present invention, a spherical body polishing apparatus capable of reducing polishing costs can be thus provided.

Preferably, in the above-described spherical body polishing apparatus, the abrasive grain includes at least one selected from the group consisting of a diamond particle, a cubic boron nitride particle and a boron carbide particle.

Employment of such a particle having extremely high hardness makes it possible to perform polishing on a spherical body made of a high hardness material such as ceramic. Since the abrasive grain has extremely high hardness and is expensive, employment thereof for the spherical body processing apparatus of the present invention capable of reducing the thickness of the abrasive grain layer and thereby suppressing the amount of use of the abrasive grains and capable of limiting processing on the abrasive grain layer allows reducing effect on polishing costs to be particularly enhanced.

Preferably, in the above-described spherical body polishing apparatus, the abrasive grain layer has a configuration in which the abrasive grains are bonded together with a bonding agent. This allows for easy formation of the abrasive grain layer including various abrasive grains.

In the above-described spherical body polishing apparatus, the bonding agent may include at least one selected from the group consisting of a resinoid bond, a vitrified bond and a metal bond. This allows for easy formation of the abrasive grain layer having a sufficient strength.

In the above-described spherical body polishing apparatus, the holding layer may be formed of the bonding agent bonding the abrasive grains together in the abrasive grain layer.

This allows for efficient fabrication of the abrasive grain layer and the holding layer on the abrasive grain layer, through formation of a mixed layer of the abrasive grains and the bonding agent, followed by formation of a layer formed of the bonding agent on the mixed layer and subsequent execution of processing such as calcination.

In the above-described spherical body polishing apparatus, the holding layer may be formed of steel or cast metal. This allows for formation of a holding layer having a sufficient strength and being inexpensive.

A method for polishing a spherical body according to the present invention includes the steps of arranging a spherical body to be processed between a first member having a first polishing surface and a second member having a second polishing surface opposed to the first polishing surface, and polishing the spherical body by applying a relative rotation to the first polishing surface and the second polishing surface while keeping the surfaces opposed to each other. At least one of the first polishing surface and the second polishing surface has a groove portion formed therein and extending circumferentially along the rotation. At least one of the first member and the second member having the groove portion formed therein includes an abrasive grain layer including an abrasive grain having a higher hardness than that of the spherical body and a holding layer formed on the abrasive grain layer and having a lower hardness than that of the abrasive grain layer. The groove portion is formed to penetrate the holding layer in a depth direction and to reach the abrasive grain layer. In the step of polishing the spherical body, the spherical body is polished by coming into contact with the abrasive grain layer while being held in the holding layer in the groove portion.

In the method for polishing a spherical body of the present invention, in the step of polishing a spherical body, the spherical body is polished by coming into contact with the abrasive grain layer while being held in the holding layer which is in the groove portion and formed on the abrasive grain layer. A stable hold of the spherical body can be provided by allowing the holding layer having a lower hardness than the abrasive grain layer to have a larger thickness. It is therefore possible to restrict the depth of the groove portion formed in the abrasive grain layer and to reduce the thickness of the abrasive grain layer. As a result, material costs and processing costs of the abrasive grain layer which is used for polishing the spherical body can be suppressed. Further, when a need for correction processing on the groove portion depth arises, the correction processing can be achieved through processing for removing a surface layer portion of the holding layer rather than the abrasive grain layer having a high hardness. Reduction of running costs of the spherical body processing apparatus can therefore be achieved.

According to the spherical body polishing method of the present invention, a spherical body polishing method capable of reducing polishing costs can be thus provided.

Preferably, in the above-described method for polishing a spherical body, the spherical body is made of ceramic, while the abrasive grain includes at least one selected from the group consisting of a diamond particle, a cubic boron nitride particle and a boron carbide particle.

The spherical body polishing method of the present invention capable of reducing the thickness of the abrasive grain layer and thereby suppressing the amount of use of the abrasive grains and capable of limiting processing on the abrasive grain layer can provide particularly great reducing effect on polishing costs through employment of an extremely high hardness particle as described above for the abrasive grain and application to polishing a spherical body made of ceramic with a high hardness.

Preferably, in the above-described method for polishing a spherical body, the abrasive grain layer has a configuration in which the abrasive grains are bonded together with a bonding agent. This allows for easy formation of the abrasive grain layer including various abrasive grains, and a further reduction of polishing costs can be achieved.

In the above-described method for polishing a spherical body, the bonding agent may include at least one selected from the group consisting of a resinoid bond, a vitrified bond and a metal bond. This allows for use of an abrasive grain layer having a sufficient strength in performing polishing on the spherical body.

In the above-described method for polishing a spherical body, the holding layer may be formed of the bonding agent bonding the abrasive grains together in the abrasive grain layer.

This allows for efficient fabrication of the abrasive grain layer and the holding layer on the abrasive grain layer, through formation of a mixed layer of the abrasive grains and the bonding agent, followed by formation of a layer formed of the bonding agent on the mixed layer and subsequent execution of processing such as calcination.

In the above-described method for polishing a spherical body, the holding layer may be formed of steel or cast metal. This allows for use of a holding layer having a sufficient strength and being inexpensive in performing polishing on the spherical body.

A method for manufacturing a spherical member according to the present invention includes the steps of preparing a spherical body and polishing the spherical body. In the step of polishing the spherical body, the spherical body is polished by the above-described method for polishing a spherical body according the present invention.

According to the method for manufacturing a spherical member according to the present invention, the spherical member can be manufactured inexpensively through employment of the above-described method for polishing a spherical body capable of reducing polishing costs.

Effects of the Invention

As can be clearly seen from the description above, according to the spherical body polishing apparatus, the method for polishing a spherical body and the method for manufacturing a spherical member of the present invention, a spherical body polishing apparatus, a method for polishing a spherical body and a method for manufacturing a spherical member which are capable of reducing polishing costs can be provided.

MODES FOR CARRYING OUT THE INVENTION

Embodiments of the present invention will be described hereinafter in detail with reference to the drawings. In the drawings, the same or corresponding elements have the same reference numbers allotted and description thereof will not be repeated.

First Embodiment

Figure 1:
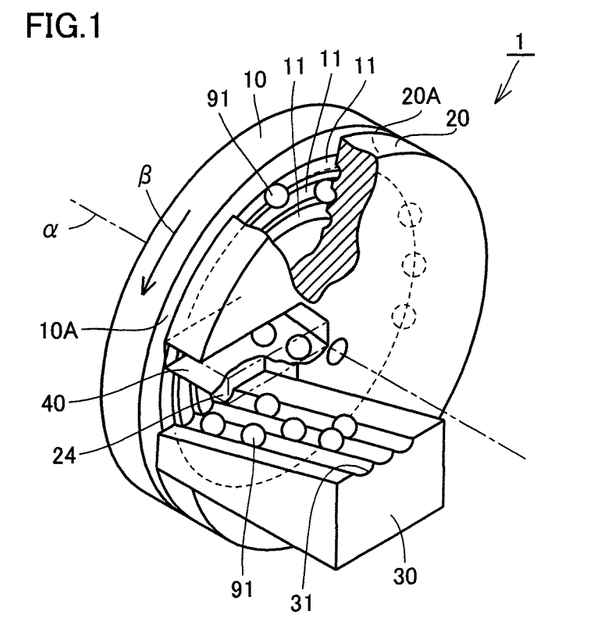
FIG. 1 is a schematic view illustrating a configuration of a spherical body polishing apparatus in a first embodiment.

A first embodiment which is one embodiment of the present invention will be described below. Referring to FIG. 1, a polishing apparatus 1 in the first embodiment includes a rotating disk 10 which is a disk-like surface plate having a rotating disk polishing surface 10A, a fixed disk 20 which is a disk-like surface plate having a fixed disk polishing surface 20A opposed to rotating disk polishing surface 10A, an inlet chute 30 for introducing a material ball 91, which is a spherical body, between rotating disk 10 and fixed disk 20, and an outlet chute 40 for discharging polished material ball 91 out.

Fixed disk 20 and rotating disk 10 are arranged to leave a predetermined space therebetween such that fixed disk polishing surface 20A and rotating disk polishing surface 10A are parallel to each other and the central axis is in agreement with a rotational axis α. Further, fixed disk 20 is fixed relative to a stand (not shown) holding fixed disk 20, while rotating disk 10 is rotatable around rotational axis cc (in a rotational direction β which is along the circumferential direction of rotating disk 10).

Figure 2:
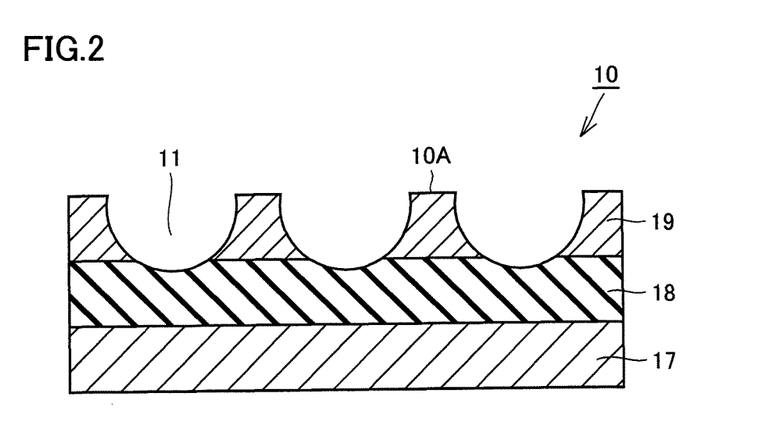
FIG. 2 is a schematic cross-sectional view illustrating a configuration of a surface plate included in the spherical body polishing apparatus of FIG. 1.

Referring to FIGS. 1 and 2, rotating disk polishing surface 10A has a plurality of (three in the present embodiment) concentric ring-like groove portions 11 formed therein and having the center at the point of intersection of rotating axis α and rotating disk polishing surface 10A. In other words, rotating disk polishing surface 10A has three groove portions 11 formed therein and extending circumferentially along rotation of rotating disk 10.

Fixed disk 20 has an opening 24 formed therein and penetrating fixed disk 20 in a thickness direction (a direction along rotational axis α). From opening 24, three groove portions 11 formed in rotating disk polishing surface 10A are exposed. Meanwhile, inlet chute 30 has an upper surface on which a plurality of grooves 31 extending in parallel to one another are formed. Inlet chute 30 is arranged to allow a portion thereof to be inserted into opening 24 such that a direction in which grooves 31 extend intersects groove portions 11 formed in rotating disk polishing surface 10A and one end of groove 31 is adjacent to groove portion 11. Also, inlet chute 30 is fixed on a stand not shown in the drawings in a manner allowing the upper surface to intersect a horizontal plane, such that grooves 31 are inclined toward opening 24. This causes material ball 91 supplied to groove 31 of inlet chute 30 to roll along groove 31 and to be introduced between rotating disk 10 and fixed disk 20.

Outlet chute 40 is arranged to be adjacent to inlet chute 30 on the side opposite to rotational direction β of rotating disk 10 and to penetrate fixed disk 20 in the direction of rotational axis α.

Next, referring to FIG. 2, details of rotating disk 10 will be described. It is noted that FIG. 2 corresponds to a cross-sectional view of rotating disk 10 taken along a plane which is perpendicular to rotating disk polishing surface 10A and in the radial direction of rotating disk polishing surface 10A. Here, as in rotating disk polishing surface 10A, fixed disk polishing surface 20A of fixed disk 20 has a plurality of (three in the present embodiment) concentric ring-like groove portions (not shown) formed therein and having the center at the point of intersection of rotating axis α and fixed disk polishing surface 20A. These plurality of (three) groove portions and three groove portions 11 of rotating disk polishing surface 10A are arranged to be opposed to each other, respectively. Fixed disk 20 has a configuration similar to that of rotating disk 10, which will be described below.

Referring to FIG. 2, rotating disk 10 in the first embodiment includes a disk-like surface plate body 17 formed of a material such as iron and cast metal, an abrasive grain layer 18 arranged on surface plate body 17 and including diamond particles serving as abrasive grains, and a holding layer 19 formed on abrasive grain layer 18 and formed of steel. Holding layer 19 has a lower hardness than that of abrasive grain layer 18. Groove portions 11 are formed to penetrate holding layer 19 from rotating disk polishing surface 10A, which is a surface of holding layer 19 on the side opposite to abrasive grain layer 18, and in a depth direction and to reach abrasive grain layer 18. In other words, groove portion 11 has a bottom portion located within abrasive grain layer 18. Also, groove portion 11 has, in a cross-section perpendicular to a direction in which it extends, a wall surface having an arc-like shape. This results in that abrasive grain layer 18 is exposed at the bottom portion of groove portion 11 which contributes to polishing a material ball 91 and that a side wall portion (an area where the wall surface of groove portion 11 and a region of rotating disk polishing surface 10A where no groove portion 11 is formed intersect) of groove portion 11 which contributes to holding material ball 91 is located within holding layer 19. Abrasive grain layer 18 has a configuration in which abrasive grains are bonded together with a bonding agent.

Accordingly, the spherical body polishing apparatus 1 in the first embodiment is an apparatus for polishing a spherical body. The apparatus includes rotating disk 10 which is a first member having rotating disk polishing surface 10A serving as a first polishing surface, and fixed disk 20 which is a second member having fixed disk polishing surface 20A opposed to rotating disk polishing surface 10A and serving as a second polishing surface. Rotating disk polishing surface 10A is capable of relative rotation while keeping being opposed to fixed disk polishing surface 20A. Rotating disk polishing surface 10A has a groove portion 11 formed therein and extending circumferentially along the rotation. Rotating disk 10 having groove portion 11 formed therein includes abrasive grain layer 18 including abrasive grains formed of diamond particles having a higher hardness than that of material ball 91 which is a spherical body and holding layer 19 formed on abrasive grain layer 18 and having a lower hardness than that of abrasive grain layer 18. Groove portion 11 is formed to penetrate holding layer 19 in a depth direction and to reach abrasive grain layer 18.

Next, description will be given of a method for manufacturing a ball for a bearing as a spherical member, which is carried out employing a polishing method using the above-described spherical body polishing apparatus 1 in the first embodiment.

Figure 3:
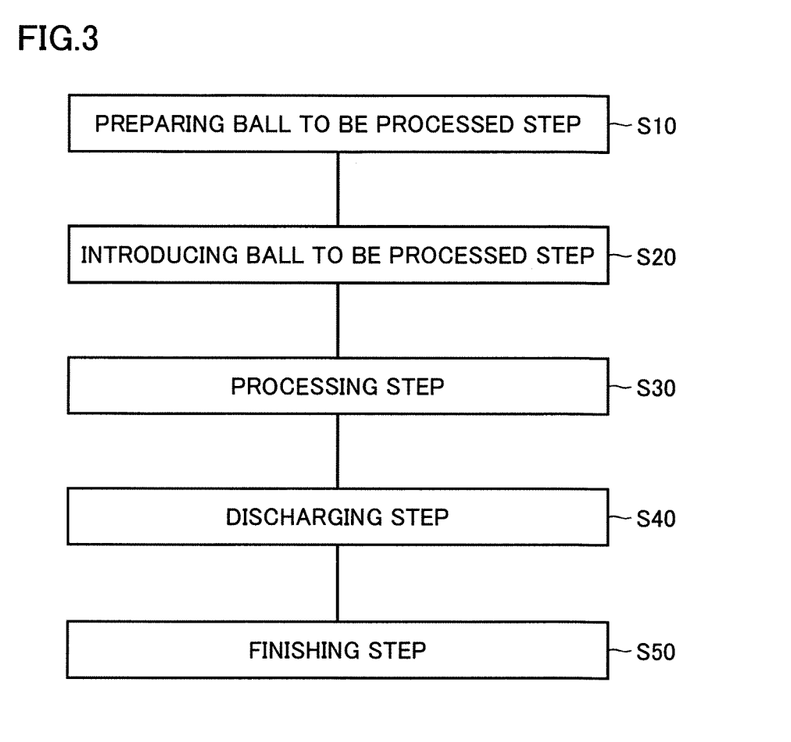
FIG. 3 is a flow chart showing an outline of a method for manufacturing a ball for a bearing in the first embodiment.

Referring to FIG. 3, in the method for manufacturing a ball for a bearing in the first embodiment, first, the step of preparing a ball to be processed is carried out as a step (S10).

Specifically, referring to FIGS. 1 to 3, for example, after preparation of material powder of ceramic such as silicon nitride and sialon and shaping of the material powder into a spherical form, pressure sintering, normal pressureless sintering or the like is carried out, thereby fabricating material ball 91 as a spherical body formed of a ceramic sintered body.

Next, the step of introducing a ball to be processed is carried out as a step (S20). In step (S20), material ball 91 prepared in step (S10) is introduced into the polishing apparatus illustrated in FIG. 1. Specifically, referring to FIG. 1, material ball 91 prepared in step (S10) is introduced onto groove 31 on inlet chute 30. The introduced material ball 91 rolls on groove 31 of inlet chute 30, passes through opening 24 and proceeds to a position where the ball comes into contact with groove portion 11 of rotating disk 10. At this time, rotating disk 10 is caused to rotate in rotational direction β so that material ball 91 is drawn into the space between rotating disk 10 and fixed disk 20 opposed to each other.

Next, the step of processing is carried out as a step (S30). In step (S30), material ball 91 drawn into the space between rotating disk 10 and fixed disk 20 is held between groove portion 11 formed in rotating disk 10 and the groove portion formed in fixed disk 20 and polished by rolling in rotational direction β of rotating disk 10. Specifically, referring to FIG. 2, material ball 91 drawn into the space between rotating disk 10 and fixed disk 20 is polished by sliding and rolling against abrasive grain layer 18 exposed at groove portion 11 while being held in the radial direction of rotating disk 10 by holding layer 19 within groove portion 11. It is noted that in step (S30), a polishing liquid including loose abrasive grains may be supplied between rotating disk 10 and fixed disk 20.

Next, the step of discharging is carried out as a step (S40). In step (S40), material ball 91 having been polished is discharged from outlet chute 40. Specifically, referring to FIG. 1, material ball 91 polished in step (S30) by rolling in rotational direction β of rotating disk 10 leaves groove portion 11 by proceeding to a position where outlet chute 40 is arranged and discharged via outlet chute 40 out of polishing apparatus 1.

Next, the step of finishing is carried out as a step (S50). In step (S50), finishing processing is performed on material ball 91 prepared in step (S10) and polished in steps (S20) to (S40), and a ball for a bearing as a spherical member is thereby completed. Specifically, finishing processing for achieving a further reduced surface roughness of material ball 91 is performed on material ball 91 which has completed up to step (S40), in polishing apparatus 1 described based on FIG. 1, using another polishing apparatus in which abrasive grains included in abrasive grain layer 18 are formed of finer diamond particles, in the same procedure as in the above-described case. This finishing processing may be carried out a plurality of times, with gradually finer diamond particles constituting the abrasive grains. Also, lapping using a publicly-known lapping disk may be carried out as the final polishing. The steps above complete a ball (rolling element) for a rolling bearing as a spherical member in the present embodiment.

With the polishing method using polishing apparatus 1 in the present embodiment above, referring to FIGS. 1 and 2, it is possible to provide a stable hold of material ball 91 by increasing the thickness of holding layer 19. It is therefore possible to restrict the depth of groove portion 11 formed in abrasive grain layer 18 and to reduce the thickness of abrasive grain layer 18. As a result, material costs and processing costs of the abrasive grain layer which includes abrasive grains made of extremely expensive diamond and is difficult to process can be suppressed.

Further, when polishing apparatus 1 is continuously used in a production line for a ball for a bearing, the wearing away of abrasive grain layer 18 which contributes to polishing of material ball 91 progresses, and the depth of groove portion 11 increases. The depth of groove portion 11 increased beyond a limit results in contact between fixed disk 20 and rotating disk 10. Hence, a need for correction processing on the groove portion depth arises. With polishing apparatus 1 in the present embodiment, holding layer 19 having a lower hardness than that of abrasive grain layer 18 is formed on abrasive grain layer 18. Thus, by removing a surface layer of easily processable holding layer 19, the correction processing on the groove portion depth can be achieved. Consequently, as compared with a conventional polishing apparatus in which one layer of an abrasive grain layer forms abrasive grain layer 18 and holding layer 19, costs required for the correction processing on the groove portion depth can be suppressed, and reduced running costs can be achieved.

More specifically, referring to FIGS. 1 and 2, when a need for the correction processing on the groove portion depth of rotating disk 10 for example arises, with a conventional polishing apparatus in which one layer of an abrasive grain layer forms abrasive grain layer 18 and holding layer 19, rotating disk 10 is removed from the polishing apparatus and the correction processing is performed using a costly method such as electric discharge machining. Further, when attaching rotating disk 10 back to the polishing apparatus, the accuracy of this attachment has a great impact on the processing accuracy of material ball 91. A fine adjustment after attachment must therefore be done. The fine adjustment can be achieved, for example, by performing a running-in operation in which material ball 91 is actually polished to check the polished state of material ball 91. Such a fine adjustment after attachment prolongs downtime of a production line and brings about increased costs.

In contrast, with the polishing method using polishing apparatus 1 in the present embodiment, since rotating disk polishing surface 10A of rotating disk 10 has a surface layer portion configured of holding layer 19 having a low hardness, the correction processing on the groove portion depth can be performed without removing rotating disk 10 from polishing apparatus 1 and by using an inexpensive method. For instance, referring to FIG. 1, when a need for the correction processing on the groove portion depth of rotating disk 10 arises, the correction processing can be performed by inserting a dresser from opening 24 to bring the dresser in contact with holding layer 19 while rotating disk 10 is allowed to rotate, and removing the surface layer portion of holding layer 19. That is, polishing apparatus 1 in the present embodiment allows for an in-line correction processing on the groove portion depth. As a result, there is no need for a costly processing such as electric discharge machining and it is therefore possible not only to suppress processing costs for the correction processing on the groove portion depth, but also to significantly reduce downtime of a production line involved in the correction processing. A contribution to reduced production costs can be thus made.

As such, according to the method for polishing a spherical body using the spherical body polishing apparatus in the present embodiment, reduction of costs of polishing a material ball which is a spherical body can be achieved.

Second Embodiment

Next, a second embodiment which is another embodiment of the present invention will be described. The spherical body polishing apparatus in the second embodiment basically has the same configuration, operates in the same manner and exerts the same effects as those in the first embodiment. The spherical body polishing apparatus in the second embodiment, however, differs in the configuration of the holding layer from that in the second embodiment.

Figure 4:
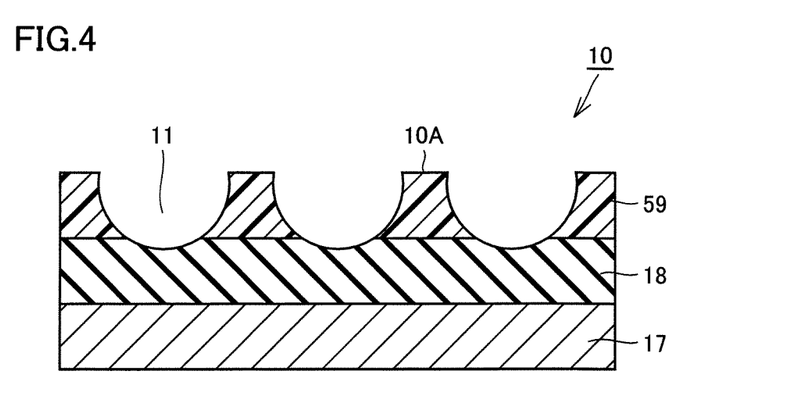
FIG. 4 is a schematic cross-sectional view illustrating a configuration of a surface plate included in a spherical body polishing apparatus of a second embodiment.

Referring to FIG. 4, abrasive grain layer 18 of rotating disk 10 in the second embodiment has a configuration in which abrasive grains made of diamonds are bonded together with a bonding agent, as in the first embodiment. Rotating disk 10 in the second embodiment employs a holding layer 59 formed of the bonding agent which bonds abrasive grains together in abrasive grain layer 18, instead of holding layer 19 formed of steel shown in FIG. 2.

This allows for efficient fabrication of abrasive grain layer 18 and holding layer 59 on abrasive grain layer 18, through formation of a mixed layer of the abrasive grains and the bonding agent, followed by formation of a layer formed of the bonding agent on the mixed layer and subsequent execution of processing such as calcination.

It is noted that referring to FIG. 1, fixed disk 20 in the second embodiment may have the same configuration as that of rotating disk 10 in the first embodiment, or may have the same configuration as that of the above-described rotating disk 10 in the second embodiment. Also, fixed disk 20 in the first embodiment may have the same configuration as that of the above-described rotating disk 10 in the second embodiment.

Further, although the embodiments above have illustrated a case where a polishing apparatus includes a rotating disk and a fixed disk, the spherical body polishing apparatus of the present invention is not limited thereto, and may be the one in which polishing surface plates opposed to each other rotate in different rotational directions and/or at different rotational speeds, thereby causing one to rotate relative to the other, for example.

Also, for the abrasive grain in the embodiments above, any particles made of various materials may be employed as long as they have a higher hardness than that of material ball 91. It is, however, preferable that the abrasive grain includes at least one selected from the group consisting of high-hardness particles of diamond, CBN, boron carbide, alumina, and silicon carbide. In particular, the effect of the present invention is significant when the abrasive grain includes at least one selected from the group consisting of diamond, CBN and boron carbide, which have extremely high hardness and are expensive.

Further, for the bonding agent which bonds the abrasive grains together in abrasive grain layer 18, although any bonding agent may be employed, for example, at least one selected from the group consisting of a resinoid bond, a vitrified bond and a metal bond can be employed.

Also, for the holding layer, as in the second embodiment above, holding layer 59 formed of a bonding agent of which abrasive grain layer 18 is configured may be employed, or holding layer 19 formed of steel, such as S53C specified under JIS may be employed. Further, for the material of which the holding layer is configured, cast iron (cast metal) such as Meehanite cast iron and gray cast iron may be employed.

Also, although the polishing method using the polishing apparatus in the embodiments above can be employed for polishing in manufacturing various spherical members, it can be particularly advantageously employed for polishing in manufacturing a ball for a rolling bearing made of silicon nitride or sialon, which needs abrasive grains with a high hardness due to its high hardness and requires a high accuracy of surface finishing.

Example 1

Example 1 of the present invention will be described below. A surface plate having the same configuration as the surface plate described in the second embodiment based on FIG. 4 was fabricated, and a study to confirm a reducing effect on manufacturing costs was conducted. Specifically, an abrasive-grain-containing layer which is a mixture of abrasive grains formed of diamond particles and a metal bond and has a thickness of 3 mm was formed on a surface plate body formed of steel. Further, a bond layer formed of the metal bond and having a thickness of 1.6 mm was formed. Subsequently, calcination was performed to fabricate a member in which an abrasive grain layer and a holding layer were formed on a surface plate body. In the surface of the holding layer-side of the member, groove portions each having a radius of curvature of 4.37 mm and a depth of 2.6 mm was then formed by electric discharge machining. Three groove portions were formed concentrically with radii of 145 mm, 132 mm and 119 mm, respectively. The surface plate having the same configuration as in FIG. 4 was thus completed (example A).

Figure 5:
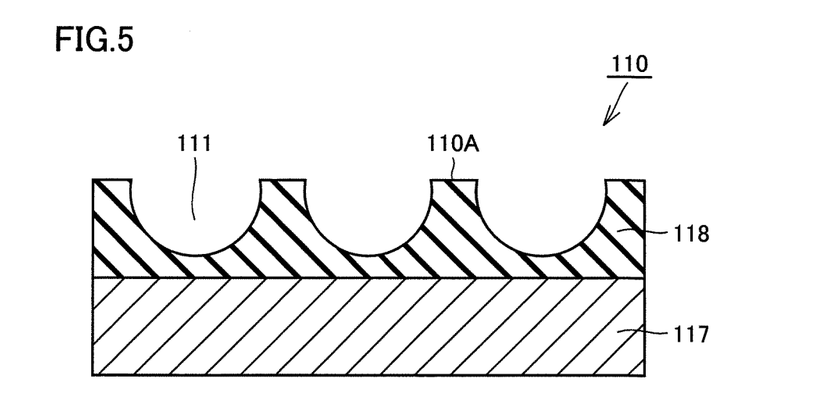
FIG. 5 is a schematic cross-sectional view illustrating a configuration of a surface plate in a comparative example.

On the other hand, for comparison, a surface plate of a comparative example which is out of the scope of the present invention was fabricated. Referring to FIG. 5, as a surface plate of a comparative example, by skipping formation of a bond layer in the same procedure as that for the surface plate of example A above and increasing the thickness of the abrasive-grain-containing layer by the thickness of the bond layer, a surface plate with an abrasive grain layer having a thickness increased by the thickness of the holding layer of example A was fabricated (comparative example A). That is, referring to FIG. 5, a surface plate 110 of the comparative example includes a surface plate body 117 and an abrasive grain layer 118 formed on surface plate body 117 and including abrasive grains formed of diamond particles. In a polishing surface 110A which is the surface of surface plate 110, a groove portion 110 having a bottom portion within abrasive grain layer 118 is formed. Manufacturing costs incurred in fabrication of example A and comparative example A were then calculated. Table 1 shows calculated fabrication costs of example A and comparative example A, defining fabrication costs of comparative example A as 1.

TABLE 1

| | Ratio of Production Costs |
|---|---|
| Example A | 0.75 |
| Comparative Example A | 1 |

Referring to Table 1, the surface plate of example A was, despite the additional step of forming the bond layer on the abrasive-grain-containing layer, able to achieve a 25% reduction in manufacturing costs relative to the surface plate of the comparative example. This is attributed to reduced material costs due to reduced thickness of the abrasive grain layer containing expensive diamond abrasive grains and also attributed to reduced processing costs due to replacement of a substantial portion of processing on the abrasive grain layer in forming the groove portion with processing on the holding layer having a low hardness. It is noted that with the surface plate of example A, abrasive grain layer 18 which contributes to polishing a spherical body is exposed at the bottom portion of the groove portion as shown in FIG. 4, and therefore, the same polishing as that of the surface plate of comparative example A shown in FIG. 5 can be performed.

The result of the study above has confirmed that according to the spherical body polishing apparatus of the present invention, it is possible to substantially reduce costs of a surface plate while maintaining functions for polishing.

Example 2

Example 2 of the present invention will be described below. An experiment was carried out in which ceramic balls having various sizes were polished using the spherical body polishing apparatus of the present invention and grinding stone lives were confirmed. The procedure of the experiment is as follows.

First, surface plates having the same respective configurations as those of the example and comparative example fabricated in Example 1 above were fabricated and used to actually polish ceramic balls made of silicon nitride and having three different sizes, 5/16 inch, 1/2 inch and 1 7/8 inch in diameter, respectively. It is noted that the depth of the groove portions was determined at the optimal value according to the size of the ceramic ball to be polished. Then, at the time when the wearing away of the abrasive grain layer due to polishing caused the depth of the groove portion to be so increased that polishing was no longer continuable, processing for removing a surface layer portion of the holding layer or the abrasive grain layer to reduce the depth of the groove portion (correction processing on the groove portion depth) was performed, and polishing was continued. The point of time when repetition of this procedure caused the wearing away of the abrasive grain layer and exposure of the surface plate body at the bottom portion of the groove portion was then recorded as a life (grinding stone life). The result of the experiment is shown in Table 2. Table 2 indicates the results with the surface plate of the examples in polishing the ceramic balls of 5/16 inch, 1/2 inch and 1 7/8 inch as examples B, C and D, respectively, the results with the surface plate of the comparative examples as comparative examples B, C and D, respectively, and shows the grinding stone lives, defining lives in comparative examples B, C and D as 1.

TABLE 2

| | Processed Ball Size | Ratio of Grinding Stone Life |
|---|---|---|
| Example B | 5/16" | 5.2 |
| Example C | 1/2" | 7.5 |
| Example D | 1 7/8" | 9.3 |
| Comparative Example B | 5/16" | 1 |
| Comparative Example C | 1/2" | 1 |
| Comparative Example D | 1 7/8" | 1 |

Referring to Table 2, when polishing is performed using the surface plate of the examples, the grinding stone lives are 5.2 to 9.3 times that of when using the surface plate of the comparative examples. This is because, in each surface plate of the comparative examples, despite the thick abrasive grain layer compared with those in the examples, the abrasive grain layer existing between the bottom portion of the groove portion and the surface plate body has a small thickness. Also, the larger the diameter of ceramic ball to be polished is, the larger the effect of use of the surface plate of the example is. This is considered ascribable to the fact that the larger the size of the ceramic ball to be polished is, the greater the depth of the groove portion must be made, thus the smaller the thickness of the abrasive grain layer existing between the bottom portion of the groove portion and the surface plate body is.

The result of the experiment above has confirmed that according to the spherical body polishing apparatus of the present invention, it is possible to improve grinding stone life of a surface plate while maintaining functions for polishing.

Example 3

Example 3 of the present invention will be described below. An experiment was conducted in which processing costs in performing a correction processing on the groove portion depth for the surface plate included in the spherical body polishing apparatus of the present invention was studied. The procedure of the experiment is as follows.

Ceramic balls were polished by polishing apparatuses including respective surface plates of the example and comparative example fabricated in Example 1 above. Then, at the time when the wearing away of the abrasive grain layer caused the depth of the groove portion to be so increased that polishing was no longer continuable, processing for removing a surface layer portion of the holding layer or the abrasive grain layer to reduce depth of the groove portion (correction processing on the groove portion depth) was performed, and the costs incurred in the correction processing on the groove portion depth was calculated. The result of the experiment is shown in Table 3. Table 3 indicates the result with the example as example E and the result with the comparative example as comparative example E and shows costs incurred in the correction processing on the groove portion depth, defining the cost of comparative example E as 1.

TABLE 3

| | Ratio of Groove Portion Depth Correction Cost |
|---|---|
| Example E | 0.024 |
| Comparative Example E | 1 |

Referring to Table 3, it has been found that use of the surface plate of the example can reduce costs of the correction processing on the groove portion depth to about 1/50 of that when using the surface plate of the comparative example. This is because of the fact that with the surface plate of the comparative example, in order to perform the correction processing on the groove portion depth, the surface plate had to be removed from the polishing apparatus and electric discharge machining had to be further performed, while with the surface plate of the example, the correction processing on the groove portion depth was able to be performed without removal from the polishing apparatus and by bringing a common dresser in contact with the holding layer to remove the surface layer portion of the holding layer.

The result of the experiment above has confirmed that according to the spherical body polishing apparatus of the present invention, reduction of costs required for the correction processing on the groove portion depth can be achieved, and it is therefore possible to reduce running costs of a polishing apparatus and to suppress costs of manufacturing a spherical member.

It should be understood the embodiments and the examples disclosed herein are illustrative and non-restrictive in every respect. The scope of the present invention is shown by the claims rather than the description above and is intended to include all modifications equivalent in meaning and scope to the claims.

INDUSTRIAL APPLICABILITY

The spherical body polishing apparatus, the method for polishing a spherical body and the method for manufacturing a spherical member of the present invention can be particularly advantageously applied to a spherical body polishing apparatus, a method for polishing a spherical body and a method for manufacturing a spherical member which require reduction of polishing costs.

DESCRIPTION OF THE REFERENCE SIGNS 1 polishing apparatus, 10 rotating disk, 10A rotating disk polishing surface, 11 groove portion, 17 surface plate body, 18 abrasive grain layer, 19 holding layer, 20 fixed disk, 20A fixed disk polishing surface, 24 opening, 30 inlet chute, 31 groove, 40 outlet chute, 59 holding layer, 91 material ball.

The invention claimed is:

1. A spherical body polishing apparatus for polishing the surface of a spherical body, the apparatus comprising:
    a first member having a first polishing surface; and
    a second member having a second polishing surface opposed to said first polishing surface,
    said first polishing surface and said second polishing surface being capable of rotation relative to each other while being opposed to each other,
    at least one of said first polishing surface and said second polishing surface having a groove portion formed therein and extending circumferentially along said rotation,
    at least one of said first member and said second member having said groove portion formed therein including:
        an abrasive grain layer including an abrasive grain having a higher hardness than that of said spherical body, wherein said abrasive grain layer has a configuration in which said abrasive grains are bonded together with a bonding agent, and
        a holding layer formed on said abrasive grain layer and having a lower hardness than that of said abrasive grain layer, wherein said holding layer has, in a cross section perpendicular to a direction in which said groove portion extends, an arc-shaped wall surface, and said holding layer is formed of said bonding agent, and
    said groove portion being formed to penetrate said holding layer in a depth direction and to reach said abrasive grain layer, and
    said groove portion has a bottom portion located within said abrasive grain layer.

2. The spherical body polishing apparatus according to claim 1, wherein
    said abrasive grain includes at least one selected from the group consisting of a diamond particle, a cubic boron nitride particle and a boron carbide particle.

3. The spherical body polishing apparatus according to claim 1, wherein
    said bonding agent includes at least one selected from the group consisting of a resinoid bond, a vitrified bond and a metal bond.

4. A method for polishing a spherical body, comprising the steps of:
    arranging a spherical body to be processed between a first member having a first polishing surface and a second member having a second polishing surface opposed to said first polishing surface; and
    polishing said spherical body by applying a relative rotation to said first polishing surface and said second polishing surface while keeping said first and second polishing surfaces opposed to each other, at least one of said first polishing surface and said second polishing surface having a groove portion formed therein and extending circumferentially along said rotation, at least one of said first member and said second member having said groove portion formed therein including:

an abrasive grain layer including an abrasive grain having a higher hardness than that of said spherical body, wherein said abrasive grain layer has a configuration in which said abrasive grains are bonded together with a bonding agent, and a holding layer formed on said abrasive grain layer and having a lower hardness than that of said abrasive grain layer, wherein said holding layer has, in a cross section perpendicular to a direction in which said groove portion extends, an arc-shaped wall surface, and said holding layer is formed of said bonding agent, said groove portion being formed to penetrate said holding layer in a depth direction and to reach said abrasive grain layer, said groove portion has a bottom portion located within said abrasive grain layer, and in said step of polishing said spherical body, said spherical body being polished by coming into contact with said abrasive grain layer while being held in said holding layer in said groove portion.

5. The method for polishing a spherical body according to claim 4, wherein said spherical body is made of ceramic, and said abrasive grain includes at least one selected from the group consisting of a diamond particle, a cubic boron nitride particle and a boron carbide particle.

6. The method for polishing a spherical body according to claim 4, wherein said bonding agent includes at least one selected from the group consisting of a resinoid bond, a vitrified bond and a metal bond.

7. A method for manufacturing a spherical member, comprising the steps of:

shaping a ceramic powder into a spherical form;

sintering said spherical form to produce a spherical body; and polishing said spherical body, in said step of polishing said spherical body, said spherical body being polished by a method comprising:

arranging said spherical body to be processed between a first member having a first polishing surface and a second member having a second polishing surface opposed to said first polishing surface; and polishing said spherical body by applying a relative rotation to said first polishing surface and said second polishing surface while keeping said first and second polishing surfaces opposed to each other, at least one of said first polishing surface and said second polishing surface having a groove portion formed therein and extending circumferentially along said rotation, at least one of said first member and said second member having said groove portion formed therein including:

an abrasive grain layer including an abrasive grain having a higher hardness than that of said spherical body, wherein said abrasive grain layer has a configuration in which said abrasive grains are bonded together with a bonding agent, and a holding layer formed on said abrasive grain layer and having a lower hardness than that of said abrasive grain layer, wherein said holding layer has, in a cross section perpendicular to a direction in which said groove portion extends, an arc-shaped wall surface, and said holding layer is formed of said bonding agent, said groove portion being formed to penetrate said holding layer in a depth direction and to reach said abrasive grain layer, said groove portion has a bottom portion located within said abrasive grain layer, and in said step of polishing said spherical body, said spherical body being polished by coming into contact with said abrasive grain layer while being held in said holding layer in said groove portion.

* * * * *